(12) United States Patent
Ho et al.

(10) Patent No.: US 7,979,554 B2
(45) Date of Patent: Jul. 12, 2011

(54) APPARATUS, SYSTEM, AND METHOD FOR ENABLING CONVERSATIONAL TRANSACTIONS IN A SERVICE ORIENTED ARCHITECTURE

(75) Inventors: Shyh-Mei F. Ho, Cupertino, CA (US); Leilei Li, San Jose, CA (US); Khiet Quang Nguyen, San Jose, CA (US); Jack Chiu-Chiu Yuan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 962 days.

(21) Appl. No.: 11/614,692

(22) Filed: Dec. 21, 2006

(65) Prior Publication Data

US 2008/0154954 A1 Jun. 26, 2008

(51) Int. Cl.
| | |
|---|---|
| G06F 15/167 | (2006.01) |
| G06F 12/00 | (2006.01) |
| G06F 17/30 | (2006.01) |
| G06F 13/38 | (2006.01) |

(52) U.S. Cl. ......... 709/227; 709/214; 709/215; 707/607
(58) Field of Classification Search .................. 709/203, 709/223, 227–229; 707/102, 206, 104.1
See application file for complete search history.

(56) References Cited

U.S. PATENT DOCUMENTS

| | | | | |
|---|---|---|---|---|
| 5,706,429 A | * | 1/1998 | Lai et al. ........................ | 709/230 |
| 5,867,661 A | * | 2/1999 | Bittinger et al. ............... | 709/227 |
| 5,889,962 A | * | 3/1999 | Hanif et al. .................... | 709/228 |
| 7,406,523 B1 | * | 7/2008 | Kruy et al. ..................... | 709/227 |
| 2002/0038336 A1 | * | 3/2002 | Abileah et al. ................. | 709/203 |
| 2003/0009545 A1 | * | 1/2003 | Sahai et al. .................... | 709/223 |
| 2005/0203944 A1 | * | 9/2005 | Dinh et al. ..................... | 707/102 |
| 2006/0106748 A1 | * | 5/2006 | Chafle et al. ....................... | 707/1 |

OTHER PUBLICATIONS

IBM, "IMS Connect Guide and Reference," Copyright 2005, Third Edition.*
IBM, "Open Transaction Manager Access Guide and Reference," Copyright 1997,2007.*

(Continued)

*Primary Examiner* — Ian N Moore
*Assistant Examiner* — Thai N Nguyen
(74) *Attorney, Agent, or Firm* — Kunzler Needham Massey & Thorpe

(57) ABSTRACT

An apparatus, system, and method are disclosed for enabling a conversational transaction in a service oriented architecture. The apparatus, system and method include receiving at an IMS Connect a first conversational transaction ("CT") request comprising a conversation option flag from a Java client over a TCP/IP connection to a first socket of the IMS Connect and transmitting the first CT request to an IMS. The apparatus, system, and method include receiving from the IMS a first response to the first CT request and a conversational transaction identifier ("CTID"), and returning the first response along with the CTID to the Java client in response to the conversation option flag being set. The first response and CTID are transmitted using TCP/IP. The response is a portion of the conversational transaction and the CTID is configured to identify to the IMS subsequent CT requests from the Java client as part of the CT.

33 Claims, 8 Drawing Sheets

OTHER PUBLICATIONS

Jantti et al., "IMS Connectivity in an On Demand Environment: A Practical Guide to IMS Connectivity", Feb. 2006 http://www.redbooks.ibm.com/abstracts/sg246794.html <retrieved on Jul. 10, 2006>.

Wendler et al., "IMS Connect 2.2 and IMS Connect Extensions", GSE Nordic Technical Conference Riga, Latvia, May 2005. http://www.gse-nordic.org/forum/wg/nrtc/2005/S53_IMSConnect2_2andIMSConnectExtensionTool.pdf <retrieved on Jul. 10, 2006>.

"IMS Connector for Java", IBM Software file:///C:/Documents%20and%20Settings/Administrator/Desktop/SVL8_06_0072/IBM%20Software%20-%20IMS%20Connector%20for%20Java%20-%20Add-on%20Overview.htm <retrieved on Jul. 10, 2006>.

"IMS Connect Guide and Reference," Version 2 Release 2, IMS Connect, 2006, p. 137-140.

Alan Cooper, "IMS Connector for Java", IMS Technical Symposium 2005, Koenigswinter, Germany, Nov. 14-17, 2005.

Kloppmann, M. et al., "Business process choreography in WebSphere: Combining the power of BPEL and J2EE," IBM Systems Journal, vol. 43, No. 2, 2004.

\* cited by examiner

APPARATUS, SYSTEM, AND METHOD FOR ENABLING CONVERSATIONAL TRANSACTIONS IN A SERVICE ORIENTED ARCHITECTURE

BACKGROUND OF THE INVENTION

1. Field of the Invention

This invention relates to conversational transactions and more particularly relates to enabling conversational transactions in a Business Process Choreography environment using Information Management System Connect.

2. Description of the Related Art

Many businesses are heavily invested in storing data in legacy-type database management systems such as IBM's Information Management System ("IMS"). With the rise of open standards, businesses desire to access data and fulfill service requests using internally and externally available web services. To avoid the expense and inconvenience of moving data in existing legacy database management systems to a service oriented architecture ("SOA") system, a need exists to access data in legacy database management systems using web services and the new Java Platform Enterprise Edition ("J2EE")-based applications.

IBM's Business Process Choreography is a tool that may be used to address some of the problems of data access in a web service environment. IMS Connect provides a gateway to IMS for Transaction Control Protocol/Internet Protocol ("TCP/IP") connections to an application server. IMS Connector for Java ("IC4J") is a resource adapter available on the application server for Java clients to access an IMS via IMS Connect. An application server may be an IBM WebSphere Application Server, a BEA WebLogic Server®, and the like. An application server may include a business process server, such as IBM's WebSphere Process Server ("WPS"), and may be able to process business transactions.

One important type of business transaction is a conversational transaction. A conversational transaction is a business transaction made up of several steps. A conversational transaction ("CT") does not process an entire transaction at one time, but is made up of several steps. An application running on IMS or another database management server capable of conversational transactions ("CT application") divides processing of a CT into a connected series of terminal-to-application-to-terminal interactions.

For example, an IMS running a CT application may receive a first transaction request from a Java client through an IMS Connect. The CT application processes the request and returns a response to the Java client, typically on the same socket of the IMS Connect that received the request. Typically, a socket of an IMS Connect in communication with a Java client is a TCP/IP connection. The Java client then makes a second request to the IMS and the IMS responds. This conversational transaction continues until the Java client signals an end of transaction to the IMS.

In the prior art, the IMS Connect receives a conversational transaction identifier ("CTID") and a conversation indicator. The CTID is generated by the IMS to internally keep track of the CT. One name for the CTID is a Transaction Instance Block ("TIB") token. When a transaction is a conversational transaction, the IMS passes the TIB token or CTID back to the IMS Connect with the conversation indicator. Typically the conversation indicator is a flag that signals the IMS that the transaction is a CT. In prior art systems, the IMS Connect stores the CTID and maintains or persists the socket connection to the Java client until the conversational transaction is completed. The IMS understands that any transaction request received over the persistent socket pertains to the same CT. When a subsequent request is received from the Java client over the persistent socket connection, the IMS Connect attaches the CTID to the request and passes the request and the CTID to the IMS.

In today's service oriented architectures, however, service requests may be routed through any number of pathways to an intended target. In an SOA, an IMS Connect may receive a first CT request from a Java client and transmit the request to the IMS. The IMS Connect would then receive the CTID and conversation indicator along with a first CT response, store the CTID, pass the first CT response to the Java client, and release the socket connection to the Java client. The IMS Connect may then receive a second CT request pertaining to the same CT over a second socket connection. The IMS Connect would not recognize the second CT request as pertaining to the first CT and would pass the second CT request to the IMS without the corresponding CTID. The IMS would then generate an error, not knowing the CT to which the second CT request belongs.

SUMMARY OF THE INVENTION

From the foregoing discussion, it should be apparent that a need exists for an apparatus, system, and method that enable conversational transactions in a service oriented architecture. Beneficially, such an apparatus, system, and method would allow an IMS Connect to keep track of parts of a conversational transaction received over different connections to the IMS Connect.

The present invention has been developed in response to the present state of the art, and in particular, in response to the problems and needs in the art that have not yet been fully solved by currently available conversational transactions. Accordingly, the present invention has been developed to provide an apparatus, system, and method for enabling service oriented transactions in a service oriented environment that overcome many or all of the above-discussed shortcomings in the art.

A method of the present invention is also presented for enabling a conversational transaction in a service oriented architecture. The method in the disclosed embodiments substantially includes the steps necessary to carry out the functions presented below with respect to the operation of the described apparatus and system. In one embodiment, the method includes receiving at an IMS Connect a first CT request, which includes a conversation option flag, from a Java client over a TCP/IP connection to a first socket of the IMS Connect. The first CT request includes a portion of a conversational transaction. The method includes transmitting the first CT request to an IMS and receiving from the IMS a first response to the first CT request and a CTID. The response includes a portion of the CT, and the CTID is configured to identify to the IMS at least one subsequent request from the Java client as part of the CT. The method includes returning the first response along with the CTID to the Java client in response to the conversation option flag being set. The first response and CTID are transmitted using TCP/IP.

In one embodiment, the method includes receiving a second CT request, that includes the CTID, from the Java client over a second socket of the IMS Connect and transmitting the second CT request and the CTID to the IMS. In the embodiment, the method includes receiving from the IMS a second response and the CTID and returning the second response and the CTID to the Java client using TCP/IP. The second response is in response to the second CT request and is a portion of the CT. In another embodiment, the method includes transmitting a conversation end indicator and the CTID to the IMS in response to receiving a conversation end indicator and the CTID from the Java client.

In one embodiment, the method includes returning the first response without the CTID to the Java client, storing the CTID in the IMS Connect, and persisting the first socket, each in response to the conversation option flag not being set. In a further embodiment, the method includes receiving a second CT request from the Java client over the first socket and transmitting to the IMS the second CT request and the CTID stored by the IMS Connect. The second CT request is a portion of the CT. In the further embodiment, the method also includes receiving a second CT response to the second CT request and the CTID from the IMS and returning the second CT response without the CTID to the Java client over the persistent first socket.

The method of the further embodiment may include transmitting a conversation end indicator to the IMS and releasing the first socket in response to receiving a conversation end indicator from the Java client. The method of the further embodiment may also include receiving a conversation indicator from the IMS along with the first CT response, the conversation indicator configured to identify the CT associated with the first CT request and first CT response as part of a CT. In another embodiment, the IMS Connect stores the CTID in response to the conversation option flag not being set and in response to the conversation indicator.

In one embodiment, receiving a first CT request from a Java client further includes receiving the first CT request from the Java client through an application server. In another embodiment, the application server is a WebSphere Application Server ("WAS"). In another embodiment, the application server includes an IMS Connector for Java ("IC4J") resource adapter and receiving the first CT request from the Java client through an application server includes receiving the first CT request through the IC4J resource adapter.

In one embodiment, the CTID comprises a TIB token used by the IMS to track the CT. In another embodiment, the CTID is transmitted in a header of a CT request or a CT response. In another embodiment, the CTID comprises an eight byte string. In yet another embodiment, the conversational transaction is part of a WebSphere Business Process Choreography transaction.

Another method of the present invention is also presented for enabling a conversational transaction in a service oriented architecture. The method in the disclosed embodiments substantially includes the steps necessary to carry out the functions presented below with respect to the operation of the described apparatus and system. In one embodiment, the method includes transmitting a first CT request, that includes a conversation option flag, from a Java client to a first socket of an IMS Connect using TCP/IP. The method includes receiving a first CT response to the first CT request and a CTID over a TCP/IP connection and transmitting a second CT request comprising the CTID to a second socket of the IMS Connect using TCP/IP. The method includes receiving a response to the second CT request and the CTID over a TCP/IP connection.

In one embodiment, transmitting the first and second CT requests includes transmitting the CT requests through an application server. In another embodiment, the application server includes a resource adapter that converts service requests in a SOA from the Java client to TCP/IP service requests for an IMS Connect. In another embodiment, the resource adapter includes an IC4J. In yet another embodiment, the method includes creating a first CT request with a header comprising a data structure that contains the conversation option flag and the CTID. In a variation of the embodiment, the portion of the data structure in the first CT request configured to contain the CTID is empty. In yet another embodiment, a resource adapter creates the header for the first CT request.

In one embodiment, the IMS Connect is configured to transmit the first CT request and the conversation option flag to an IMS in response to receiving the first CT request and the conversation option flag and to transmit the first CT response and the CTID to the Java client in response to receiving the first CT response and the CTID and the conversation option flag being set. In another embodiment, the method includes transmitting a conversation transaction end indicator and the CTID to the IMS Connect.

An apparatus to enable a conversational transaction in a service oriented architecture is provided with a plurality of modules configured to functionally execute the necessary steps of carrying out conversational transactions over more than one socket connection to an IMS Connect. These modules in the described embodiments include a first request receive module that receives at an IMS Connect a first CT request, that includes a conversation option flag, from a Java client over a TCP/IP connection to a first socket of the IMS Connect. The first CT request is a portion of a conversational transaction. The apparatus includes a first request transmit module that transmits the first CT request to an IMS. The apparatus includes a first response receive module that receives from the IMS a first response to the first CT request and a CTID. The response is a portion of the CT and the CTID is configured to identify to the IMS at least one subsequent CT request from the Java client as part of the CT. The apparatus includes a first response return module that returns the first response along with the CTID to the Java client in response to the conversation option flag being set. The response and CTID are transmitted using TCP/IP.

The apparatus includes, in one embodiment, a second request receive module that receives a second CT request that includes the CTID from the Java client over a second socket of the IMS Connect. The apparatus includes a second request transmit module that transmits the second CT request and the CTID to the IMS. The apparatus includes a second response receive module that receives from the IMS a second response and at least the CTID. The second response is responsive to the second CT request and is a portion of the CT. The apparatus includes a second response return module that returns the second response and the CTID to the Java client using TCP/IP.

The apparatus, in one embodiment, includes a persistent socket module that returns the first response to the Java client, stores the CTID in the IMS Connect, and persists the first socket, each in response to the conversation option flag not being set. In one embodiment, the persistent socket module includes a persistent second request module that receives a second CT request from the Java client over the first socket. The second CT request is a portion of the CT. The persistent second request module transmits to the IMS the second CT request and the CTID stored by the IMS Connect and receives a second CT response to the second CT request and the CTID from the IMS. The persistent second request module returns the second CT response to the Java client over the persistent first socket.

A system of the present invention is also presented to enable a conversational transaction in a service oriented architecture. The system may be embodied by a Java client, an IMS configured to respond to service requests from the Java client, and an IMS Connect configured to receive service requests from the Java client over a TCP/IP connection to a first socket of the IMS Connect and to transmit the service requests to the IMS. In particular, the system, in one embodiment, includes a first request receive module that receives at the IMS Connect a first CT request, that includes a conversation option flag, from the Java client over the first socket. The first CT request is a portion of a conversational transaction. The system includes, in the embodiment, a first request transmit module that transmits the first CT request to the IMS and a first response receive module that receives from the IMS a first response to the first CT request and a CTID. The response is a portion of the CT and the CTID is configured to identify to the IMS at least one subsequent CT request from the Java client as part of the CT. In the embodiment, the system includes a first response return module that returns the first response along with the CTID to the Java client in response to the conversation option flag being set. The response and CTID are transmitted using TCP/IP.

The system may further include an application server configured to facilitate transmitting the service requests from the Java client and responses to the service requests. In another embodiment, the application server comprises a WebSphere Application Server ("WAS"). In another embodiment, the application server includes a resource adapter configured to convert service requests in an SOA from the Java client to TCP/IP service requests for an IMS Connect and to convert responses to the service requests sent from the IMS Connect over a TCP/IP connection to service oriented responses compatible with the SOA. In yet another embodiment, the resource adapter is an IC4J resource adapter.

Another method of the present invention is also presented for deploying service oriented computer code to enable a conversational transaction in a service oriented architecture. The method in the disclosed embodiments substantially includes the steps necessary to carry out the functions presented above with respect to the operation of the described apparatus and system. In one embodiment, the method includes determining customer requirements for service oriented requests to an IMS, integrating service oriented computer code with an IMS Connect interface, and verifying proper integration of the service oriented computer code. The service oriented computer code is configured to receive at an IMS Connect a first conversational transaction request, that includes a conversation option flag, from a Java client over a TCP/IP connection to a first socket of the IMS Connect. The first CT request is a portion of a CT. The service oriented computer code is configured to transmit the first CT request to an IMS and to receive from the IMS a first response to the first CT request and a CTID. The response is a portion of the CT and the CTID configured to identify to the IMS at least one subsequent CT request from the Java client as part of the CT. The service oriented computer code is configured to return the first response along with the CTID to the Java client in response to the conversation option flag being set. The response and CTID are transmitted using TCP/IP.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
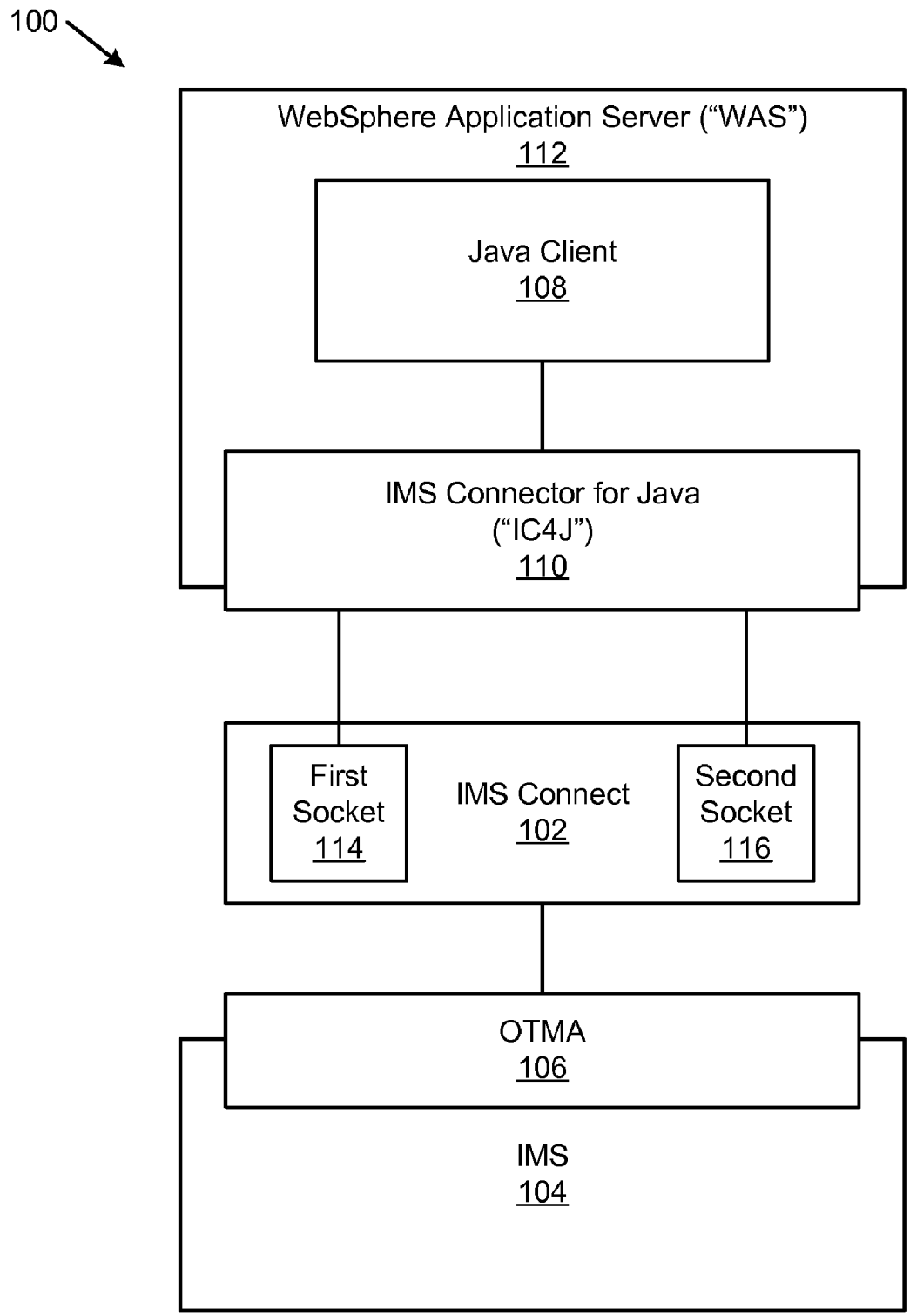
FIG. 1 is a schematic block diagram illustrating one embodiment of a system for enabling conversational transactions in a service oriented environment in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a non-transitory computer readable storage medium may take any form capable of storing a program of machine-readable instructions for execution on a digital processing apparatus. A non-transitory computer readable storage medium may be embodied by a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams described herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts a one embodiment of a system 100 for enabling conversational transactions in a service oriented environment in accordance with the present invention. The system 100 includes an IMS Connect 102 in communication with an IMS 104, through an Open Transaction Manager Access ("OTMA") 106, and a Java client 108, through an IMS Connector for Java ("IC4J") resource adapter 110 that is part of a WebSphere Application Server ("WAS") 112. The IMS Connect 102 may connect to the IC4J 110 over a first socket 114, a second socket 116, or other socket. The system 100 elements are described below.

The system 100 includes an IMS Connect 102 configured to receive service requests and to send the service requests to the IMS 104. IMS Connect 102 provides high performance communications between one or more TCP/IP or local OS/390 clients and one or more IMS systems 104. Typically, the IMS Connect 102 serves as a translator to receive service requests in a format that is not compatible with the IMS 104 and to repackage and send the requests to the IMS 104 using commands compatible with the IMS 104. For example, the IMS Connect 102 may receive a request from the Java client 108 over a TCP/IP connection. The IMS Connect 102 transmits the request using commands and formatting compatible with the IMS 104. In one embodiment, the IMS Connect 102 converts messages to an OTMA 106 message format.

The IMS Connect 102 includes multiple connections or sockets 114, 116 for connection to multiple clients. The IMS Connect 102 may include a first socket 114 that may receive a first CT request from a Java client 108 and a corresponding response, and a second socket 116 that may receive a second CT request from the Java client 108 and a corresponding response. A socket 114, 116 of the IMS Connect 102 may be a TCP/IP connection and may persist for one or more messages, transactions, requests, responses, etc. sent over the connection. Typically, the IMS Connect 102 maintains or persists a socket connection 114, 116 for a period of time.

For legacy systems, the IMS Connect 102 may persist a first socket connection 114 for an entire conversational transaction. For a service oriented architecture, where clients are more decoupled from service providers, the IMS Connect 102 may disconnect the first socket 114 after receiving a first CT request from a Java client 108 based on one or more indicators. In another embodiment, the IMS Connect 102 disconnects the first socket 114 after receiving a first CT request from a Java client 108 and transmitting a corresponding response from the IMS 104 to the Java client 108. A second CT request pertaining to the same conversational transaction as the first CT request may then be received over the second socket 116 by a different path than the connection involving the first socket 114. One of skill in the art will recognize other configurations of sockets and connections capable of transmitting CT requests and responses between a Java client 108 and an IMS Connect 102.

The system 100 includes an IMS 104 configured to service requests from a client. The IMS 104 typically includes at least one application configured as a database management program. For example, an IMS 104 may store financial information, such as customer bank account, inventory information, and the like. The IMS 104 may reside on one or more computers and typically includes multiple storage devices. In one embodiment, the IMS system 104 includes a storage area network ("SAN"). One of skill in the art will recognize other configurations of an IMS 104 and applications that may run on an IMS system 104. In the present invention, the IMS 104 refers to an IMS 104 running on a logical partition that is the target of a conversational transaction; however, the IMS Connect 102 may interface with other IMS systems 104 and applications.

In one embodiment, the IMS 104 includes an OTMA 106 configured to receive requests from the IMS Connect 102. OTMA 106 is a transaction-based, connectionless client/server protocol and is specific to the IMS 104. OTMA 106 is often used with the z/OS Cross-System Coupling Facility ("XCF"). Typically, the OTMA 106 maintains a connection with a client, such as the IMS Connect 102, while processing a request so that a response is communicated to the correct client. For a conversational transaction, the IMS 104 generates a Transaction Instance Block ("TIB") token and transmits the TIB token (which may also be called a conversational transaction identifier ("CTID") outside of the IMS 104 environment) and a conversation identifier to the IMS Connect 102 through the OTMA 106. One of skill in the art will recognize other features and advantages of an OTMA 106 and other embodiments that may be used in place of the OTMA 106 for receiving CT requests from an IMS Connect 102 and returning a response.

The system 100 includes a Java client 108 in communication with the IMS Connect 102. The Java client 108 may include any Java application that issues a request for a CT request. For example, a Java client 108 may include a web application, such as an ordering program. The web application may allow a user to initiate an order for a product from a particular company. Ordering a product may require multiple database transactions so may require a conversational transaction.

For example, an order may require a first CT request to an inventory database located on the IMS 104 to determine if a product is in stock. The IMS 104 may respond that the product is in stock and the conversational transaction proceeds. The Java client 108 may then receive a purchase request for the product from a user. The Java client 108 then sends a second CT request to the IMS 104 to request the users account on the IMS 104 be credited for the purchase price. The Java client 108 may simultaneously transmit a service request to the user's bank or credit card company to debit the user's account for the purchase price. Once the purchase is complete, the Java client 108 may send an end of transaction message to the IMS 104 to end the conversational transaction.

The Java client 108 may reside on a server, a personal computer, a mainframe computer, etc. The Java client 108 may be a user application or may be a Java-based service accessed by a user application. The Java client 108 may be in one computer program or may be divided into multiple parts working together. One of skill in the art will recognize other forms of a Java client 108 capable of carrying on conversational transactions.

In one embodiment, the system 100 includes a WebSphere Application Server ("WAS") 112 configured to include the Java client 108. In another embodiment, the Java client 108 accesses the IMS Connect 102 through the WAS 112, but the WAS 112 does not include the Java client 108. In yet another embodiment, the Java client 108 accesses the IMS Connect 102 through another application server, such as BEA's WebLogic Server. The WAS 112 or other application server typically provides access to services, application, etc. over the Internet or other network for a Java client 108. One of skill in the art will recognize other configurations of a Java client 108 in relation to an application server or WAS 112 to access the IMS Connect 102 for CT requests.

In one embodiment, the system 100 includes an IMS Connect 102 for Java ("IC4J") resource adapter 110. IC4J 110 serves as a resource adapter between the Java client 108 and the IMS Connect 102. IC4J 110 receives service requests, including CT requests from a Java client 108 and transmits the requests over a TCP/IP connection to a socket 114, 116 of the IMS Connect 102 in a format compatible with the IMS Connect 102. In the present invention, the IC4J 110 may add a header to a Java request that has a data structure ready to receive a CTID and a conversation option flag. In another embodiment, the Java client 108 or application server (possibly the WAS 112) includes a custom resource adapter configured to format requests from the Java client 108. One of skill in the art will recognize other functions and requirements for resource adapters and the IC4J 110 configured to transmit CT requests and responses between a Java client 108 and the IMS Connect 102.

Figure 2:
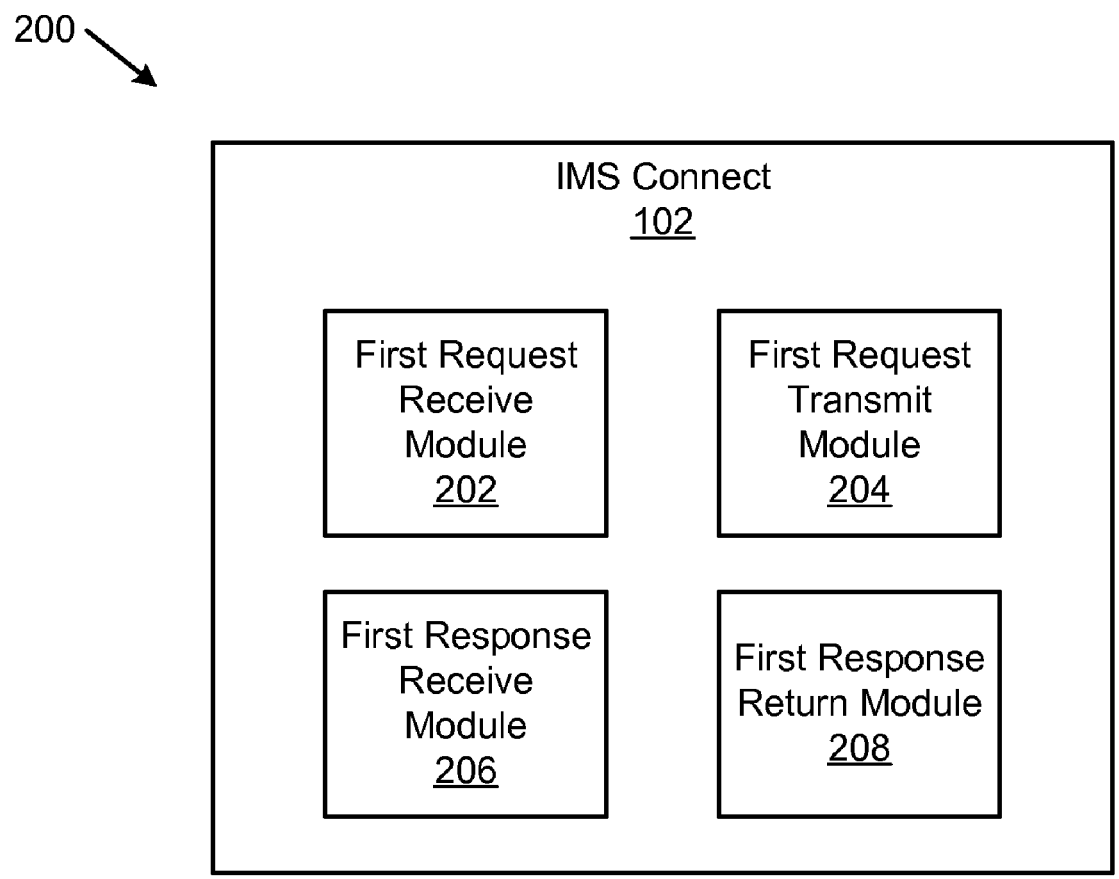
FIG. 2 is a schematic block diagram illustrating one embodiment of an apparatus for enabling conversational transactions in a service oriented environment in accordance with the present invention.

FIG. 2 is a schematic block diagram illustrating one embodiment of an apparatus 200 for enabling conversational transactions in a service oriented environment in accordance with the present invention. The apparatus 200 includes a first request receive module 202, a first request transmit module 204, a first response receive module 206, and a first response return module 208, which are described below. In one embodiment, the modules 202, 204, 206, 208 are included in the IMS Connect 102. In another embodiment, the modules 202, 204, 206, 208 are located outside the IMS Connect 102 and are capable of directing the IMS Connect 102.

The apparatus 200 includes, in one embodiment, a first request receive module 202 that receives at the IMS Connect 102 a first CT request that includes a conversation option flag from the Java client 108 over a TCP/IP connection to the first socket 114 of the IMS Connect 102. The first CT request is a portion of a conversational transaction. In one embodiment, the first request receive module 202 receives the first CT request and conversation option flag through an application server, such as the WAS 112. In another embodiment, the first request receive module 202 receives the first CT request and conversation option flag through a resource adapter, such as the IC4J 110.

The conversation option flag being set is an indicator that the conversation transaction is formatted for a service oriented architecture and that the IMS Connect 102 should not persist the connection over the first socket 114 for the entire conversational transaction. In one embodiment, the conversational transaction is part of a WebSphere Business Process Choreography transaction. If the first request receive module 202 receives a conversation option flag that is not set, the IMS Connect 102 treats the request as part of a legacy conversational transaction and persists the connection that received the first CT request throughout the conversational transaction. Legacy conversational transactions are discussed below.

The apparatus 200 includes, in one embodiment, a first request transmit module 204 that transmits the first CT request to the IMS 104. In one embodiment, the first request transmit module 204 transmits to the IMS 104 the conversation option flag with the first CT request. The conversation option flag may be part a data structure within the header of the first CT request along with a data structure to contain a CTID. In one embodiment, the CTID is an eight-byte string. Typically, the IMS 104 does not make use of the conversation option flag. The first request transmit module 204 transmits the first CT request typically using a XCF to the IMS 104 by way of the OTMA 106.

In one embodiment, the apparatus 200 includes a first response receive module 206 that receives from the IMS 104 a first response to the first CT request and a conversational transaction identifier ("CTID"). The CTID identifies to the IMS 104 at least one subsequent CT request from the Java client 108 that is part of the CT. The response is also a portion of the CT. In one embodiment, the CTID is a TIB token used by the IMS 104 to keep track of the various parts of the conversational transaction. In another embodiment, the CTID is part of a message header of the first CT request and then returned by the IMS 104 as part of the first response to the first CT request. The first response receive module 206 may also receive the conversation option flag that is passed along as part of the header. The first response receive module 206 may receive the first response from the IMS 104 through the OTMA 106 by way of a XCF.

The apparatus 200, in one embodiment, includes a first response return module 208 that cooperates with the first response receive module 206 to return the first response along with the CTID to the Java client 108 in response to the conversation option flag being set. In another embodiment, the first response return module 208 directs the IMS Connect 102 to not store the CTID because the Java client 108 manages the CTID for service oriented conversational transactions. The first response return module 208 returns the first response and CTID using TCP/IP. In one embodiment, the first response return module 208 returns the first response and CTID over the first socket 114. In another embodiment, the IMS Connect 102 does not persist the first socket 114 after the first request receive module 202 receives the first CT request and the first response return module 208 returns the first response and CTID over another socket, such as the second socket 116. Typically, the IMS Connect 102 persists the first socket 114 until the first response return module 208 returns the first response and CTID, but because the CTID is returned to the Java client 108, the IMS Connect 102 does not need to persist the socket for the first response and may instead return the first response and CTID over a second socket 116.

The apparatus 200 is advantageous because the IMS Connect 102 is no longer required to persist a socket 114 for a conversational transaction, thus freeing up network resources and allowing workload management. However, the Java client 108 must keep track of a received CTID and must initiate subsequent transactions that are part of the conversational transaction related to the CTID by attaching the CTID to the subsequent requests. In addition, the Java client 108 must send a conversation option flag with a first CT request or command a resource adapter to send a set conversation option flag with the first CT request. The apparatus 200 helps to decouple the Java client 108 from the IMS 104 for conversational transactions.

Figure 3:
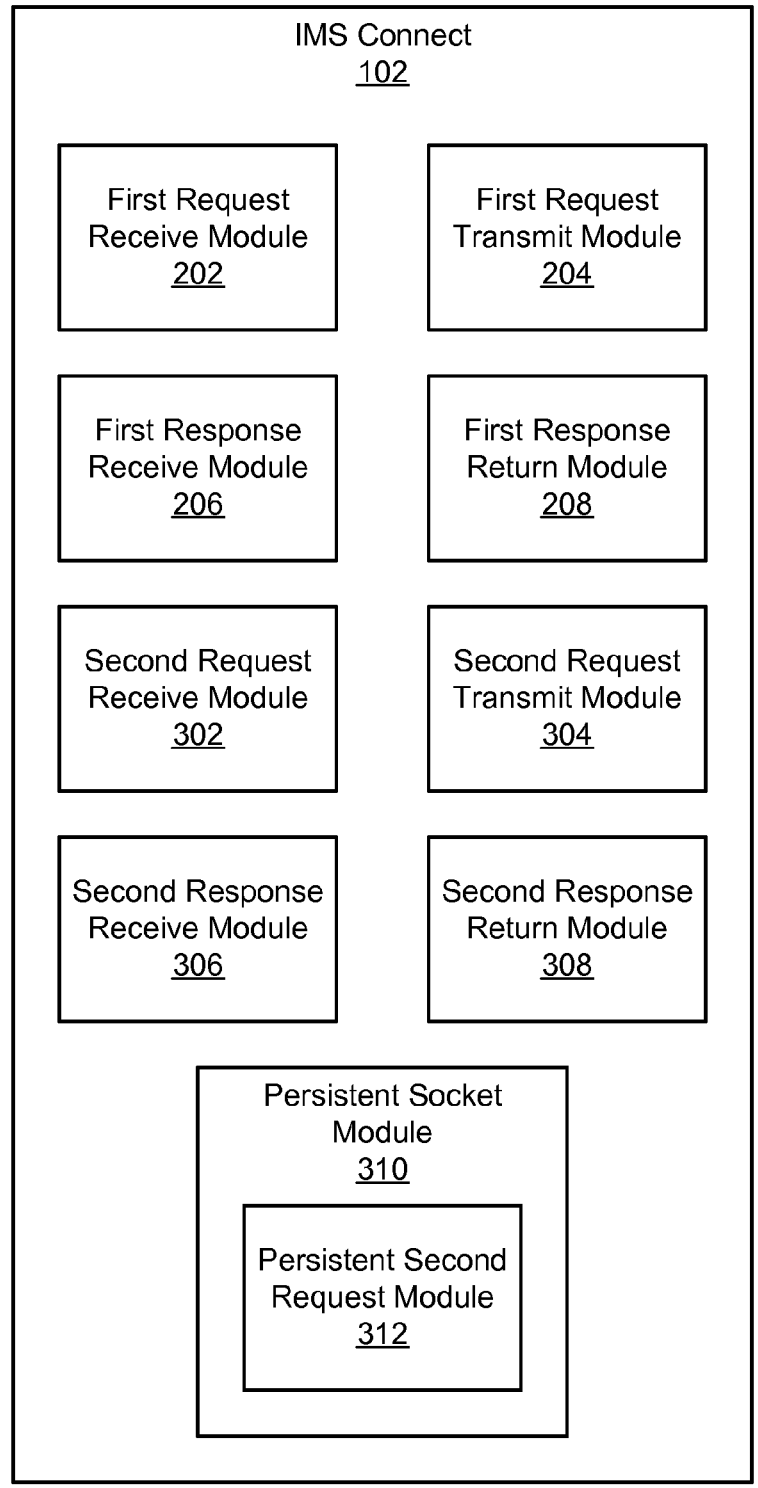
FIG. 3 is a schematic block diagram illustrating another embodiment of an apparatus for enabling conversational transactions in a service oriented environment in accordance with the present invention.

FIG. 3 is a schematic block diagram illustrating another embodiment of an apparatus 300 for enabling conversational transactions in a service oriented environment in accordance with the present invention. The apparatus 300 includes a first request receive module 202, a first request transmit module 204, a first response receive module 206, and a first response return module 208, which are substantially similar to the modules described above in relation to FIG. 2. The apparatus 300 also includes a second request receive module 302, a second request transmit module 304, a second response receive module 306, a second response return module 308, and a persistent socket module 310 with a persistent second request module 312, which are described below. In one embodiment, the modules 302, 304, 306, 308, 310, 312 are included in the IMS Connect 102. In another embodiment, the modules 302, 304, 306, 308, 310, 312 are located outside the IMS Connect 102 and are capable of directing the IMS Connect 102.

The apparatus 300, in one embodiment, includes a second request receive module 302 that receives a second CT request along with the CTID from the Java client 108 over the second socket 116 of the IMS Connect 102. The CTID is the same CTID returned to the Java client 108 by the first response return module 208 and identifies the second CT request as part of the same conversational transaction as the first CT request and first response to the first CT request.

The apparatus 300 includes a second request transmit module 304 that cooperates with the second request receive module 302 to transmit the second CT request and the CTID to the IMS 104. The second request transmit module 304 transmits the second CT request and the CTID typically to the IMS 104 by way of the OTMA 106. The IMS 104 recognizes the second CT request as part of the conversational transaction that included the first CT request because of the CTID. If the second CT request did not include the CTID, the IMS 104 would treat the second CT request as a first CT request, which would likely generate an error.

The apparatus 300 includes a second response receive module 306 that receives from the IMS 104 a second response to the second request and the CTID. The second response is a portion of the CT. The CTID is the same CTID associated with the first response and second CT request and identifies the second response as part of the same conversational transaction as the first CT request, first response, and second CT request.

The apparatus 300 also includes a second response return module 308 that cooperates with the second response receive module 306 to return the second response and the CTID to the Java client 108 using TCP/IP in response to the second request receive module 302 receiving the second request that included a CTID. Typically, when the IMS Connect 102 receives a request with a CTID, the IMS Connect 102 recognizes that the request is a service oriented CT request and not a legacy CT request. In another embodiment, the IMS Connect receives a request with a CTID as well as a conversation option flag that is set and recognizes that the request is a service-oriented CT request. The second response return module 308 may return the second response and CTID, rather than retaining the CTID and persisting a socket, in response to the second request receive module 302 receiving a request with either a CTID or a CTID and conversation option flag that is set.

Typically, the second response return module 308 returns the second response and CTID through the same socket 116 that received the second CT request. In another embodiment, the second response return module 308 returns the second response and CTID to the Java client 108 over a different socket than the socket 116 that received the second CT response. For a service-oriented CT request and response, a response is sent to the Java client 108 with a CTID so the second response can be transmitted to the Java client 108 over a different socket than the socket that received the second request.

The second request receive module 302 or similar module may also receive a conversation end indicator and the CTID. The conversation end indicator is typically configured to indicate to the IMS 104 an end to the conversation transaction associated with the CTID. In one embodiment, the conversation end indicator is received with a CT request. The second request transmit module 304 or similar module may transmit the conversation end indicator to the IMS 104 in response to receiving the conversation end indicator. In one embodiment, the conversation end indicator is transmitted along with a CT request.

In one embodiment, the apparatus 300 includes a persistent socket module 310 that returns the first response to the Java client 108, stores the CTID in the IMS Connect 102, and persists the first socket 114, each in response to the conversation option flag not being set. In one embodiment, the persistent socket module 310 responds when a first CT request does not include a conversation option flag. The persistent socket module 310 allows legacy conversational transactions where the socket that receives the first CT request is persisted for the duration of the conversational transaction. The IMS Connect 102 also stores the CTID, or TIB token, received from the IMS 104 for any subsequent requests received from the Java client 108 to support the legacy conversational transactions.

In one embodiment, the first response receive module 206 receives a conversation indicator from the IMS 104 along with the first response and CTID. The persistent socket module 310, in this embodiment, recognizes that the first CT request and subsequent first response are part of a conversational transaction. The persistent socket module 310 stores the CTID while persisting the connection on the first socket 114 in response to the conversation indicator and the conversation option flag not being set. The apparatus 300 allows and uses a conversation indicator so that the apparatus 300 is compatible with legacy conversational transactions.

In one embodiment, the persistent socket module 310 includes a persistent second request module 312 that receives a second CT request from the Java client 108 over the first socket 114. The second CT request is a portion of the first CT. The persistent second request module 312 transmits to the IMS 104 the second CT request and the CTID stored by the IMS Connect 102. The persistent second request module 312 receives a second CT response to the second CT request and the CTID from the IMS 104 and then returns the second CT response to the Java client 108 over the persistent first socket 114. In one embodiment, the persistent socket module 310 persists a connection between the Java client 108 and the first socket 114 until receiving a conversation end indicator from the Java client 108. Note that the persistent connection between the Java client 108 and the first socket 114 may include a resource adapter, such as the IC4J 110, that may be included with the Java client 108 or an application server, such as the WAS 112.

The persistent socket module 310 and persistent second request module 312 allow legacy conversational transactions, but differ from conventional technology in that they work together with the other modules of the apparatus 300 and respond to the conversation option flag. Thus apparatus 300 allows both legacy conversational transactions, where a first socket 114 is persisted for the duration of the CT, and service oriented conversational transactions, where the IMS Connect 102 allows the CT over multiple socket connections 114, 116.

Figure 4:
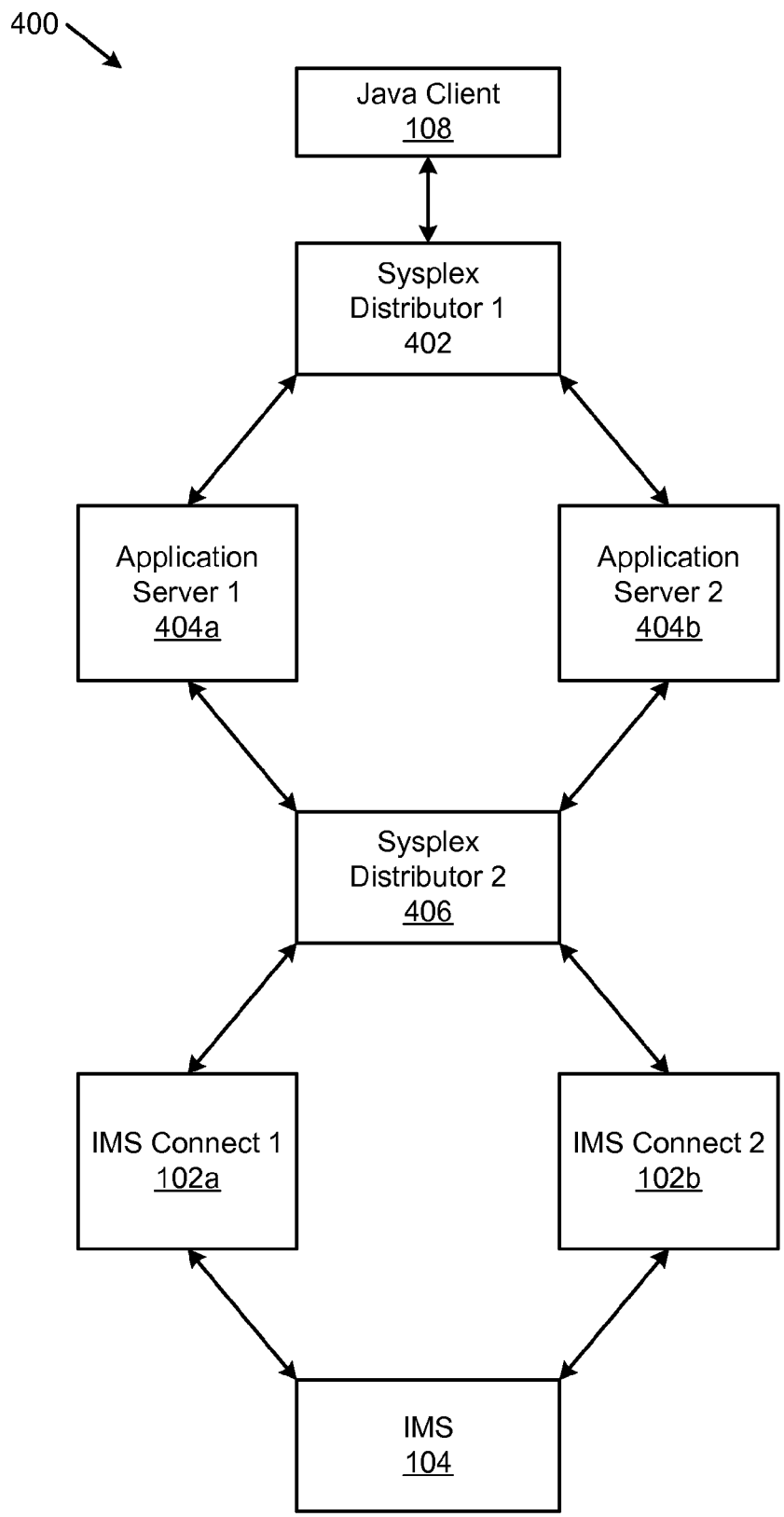
FIG. 4 is a schematic block diagram illustrating another embodiment of a system for enabling conversational transactions in a service oriented environment in accordance with the present invention.

FIG. 4 is a schematic block diagram illustrating another embodiment of a system 400 for enabling conversational transactions in a service oriented environment in accordance with the present invention. The system 400 includes a Java client 108, a first sysplex distributor 402, two or more applications servers 404, a second sysplex distributor 406, two or more IMS Connects 102, and an IMS 104, which are described below.

The system 400 includes at least one Java client 108, which is substantially similar to the Java client 108 described above. The Java client 108 is capable of sending service requests for legacy or service oriented conversational transactions. For example, one Java client 108 may send a first CT request without a conversation option flag or with a conversation option flag not set, either of which may indicate a legacy-type conversational transaction. Another Java client 108 may send a first CT request with a conversation option flag set or may direct a resource adapter to set a conversation option flag in a header attached to the first CT request to indicate a service oriented conversational transaction.

In one embodiment, the Java client 108 includes a resource adapter, such as the IC4J 110. In another embodiment, the Java client 108 is in communication with a resource adapter. The Java client 108 typically works in conjunction with a resource adapter, or computer code that performs the same function as a resource adapter, either to create a first CT request of a conversational transaction with a header that includes a conversation option flag and a data structure for a CTID, or to attach a header to a second or subsequent CT request of the conversational transaction with the CTID received from the IMS 104 that relates to the conversational transaction.

The system 400 includes a first and a second sysplex distributor 402, 406 that distributes a workload between resources, such as application servers 404 or IMS Connects 102. Typically a sysplex distributor 402 routes service requests and other network traffic to any of a plurality of resources and pathways in an attempt to spread a workload evenly. For example, if a communication pathway that includes a first application server 404*a* has a heavier load than a communication pathway that includes a second application server 404*b*, the first sysplex distributor 402 routes new service requests and network traffic through the second application server 404*b* to even out the workload between the application servers 404*a*, 404*b*. A second sysplex distributor 406 may route service requests to a group of IMS Connects 102. One of skill in the art will recognize other functions, features, and uses for a sysplex distributor 402, 406.

The system 400 includes two or more application servers 404. In one embodiment, the application servers 404 are WebSphere Application Servers 112. In another embodiment, the application servers 404 are BEA WebLogic Servers. In yet another embodiment, the application servers 404 are a combination of server types. One or more application servers 404, in one embodiment, include a resource adapter. For example, an application server 404 may include an IC4J resource adapter 110. In another embodiment, an application server 404 may include a custom or roll-your-own resource adapter. The application servers 404 communicate with Java clients 108, at least one of which is capable of generating a conversational transaction. The application servers 404 communicate with the Java clients 108 through the first sysplex distributor 402. One of skill in the art will recognize other functions and configurations of the application servers 404.

The system 400 includes one or more IMS Connects 102 and an IMS 104. The IMS Connects 102 and an IMS 104 are substantially similar to the IMS Connect 102 described above in relation to FIGS. 1, 2, and 3. The IMS Connects 102 communicate with one or more Java clients 108 through one or more sysplex distributors 404, 406. In one embodiment, the IMS Connects 102 communicate with the Java clients 108 through application servers 404. In another embodiment, the IMS Connects 102 communicate to the Java clients 108 without application servers 404. The IMS Connects 102 communicate service request and corresponding responses to an IMS 104. In another embodiment, the IMS Connects 102 communicate with more than one IMS 104, however, a conversational transaction occurs with one IMS 104. One of skill in the art will recognize other configurations and functions of a group of IMS Connects 102 in communication with Java clients 108 and at least one IMS 104.

FIG. 4 may be used to illustrate an advantage of the present invention. A Java client 108 may initiate a conversational transaction and send a first CT request, with a conversation option flag that is set in the header of the first CT request, to the IMS 104 through a first IMS Connect 102a. The first CT request may be routed by the first sysplex distributor 402 through a first application server 404a. The second sysplex distributor 406 may route the first CT request to the first IMS Connect 102a to a first request receive module 202. A first request transmit module 204 associated with the first IMS Connect 102a transmits the first CT request to the IMS 104.

The IMS 104 generates a first response and a first response receive module 206 receives the first response to the first CT request along with a CTID associated with the conversational transaction initiated by the first CT request. A first response return module 208 returns the first response and the CTID to the Java client 108 due to the conversation option flag being set. In one embodiment, the first response return module 208 returns the first response and the CTID to the Java client 108 using the same socket connection to the Java client 108 as the first CT request. In another embodiment, the first response return module 208 returns the first response and the CTID to the Java client 108 over a different connection, possibly through a different application server 404b.

The Java client 108 then generates a second CT request that is part of the same conversational transaction. The Java client 108 attaches the received CTID to the second CT request. In one embodiment, the Java client 108 or associated resource adapter puts the CTID in the header of the second CT request. The Java client 108 sends the second CT request and CTID to a second IMS Connect 102b and a second request receive module 302 of the second IMS Connect 102b receives the second CT request and CTID. The first sysplex distributor 402 in one embodiment, may route the second CT request through a second application server 404b. A second request transmit module 304 of the second IMS Connect 102b then transmits the second CT request and CTID to the IMS 104, which generates a second response and sends the second response and the associated CTID to an IMS Connect 102.

In one embodiment, the IMS 104 sends the second request to the second IMS Connect 102b, a second response receive module 306 receives the second response and CTID, and a second response return module 308 returns the second response and CTID to the Java client 108. The second response return module 308, in one embodiment, returns the second response and the CTID through the second application server 404b. In another embodiment, the second response return module 308 returns the second response and the CTID through another pathway.

As the example illustrates, the present invention is advantageous because an IMS Connect 102a that receives a first CT request is no longer required to persist a connection to a Java client 108 for subsequent responses and requests related to the conversational transaction initiated by the first CT request. The present invention enables conversational transactions in a decoupled, service oriented environment.

Figure 5:
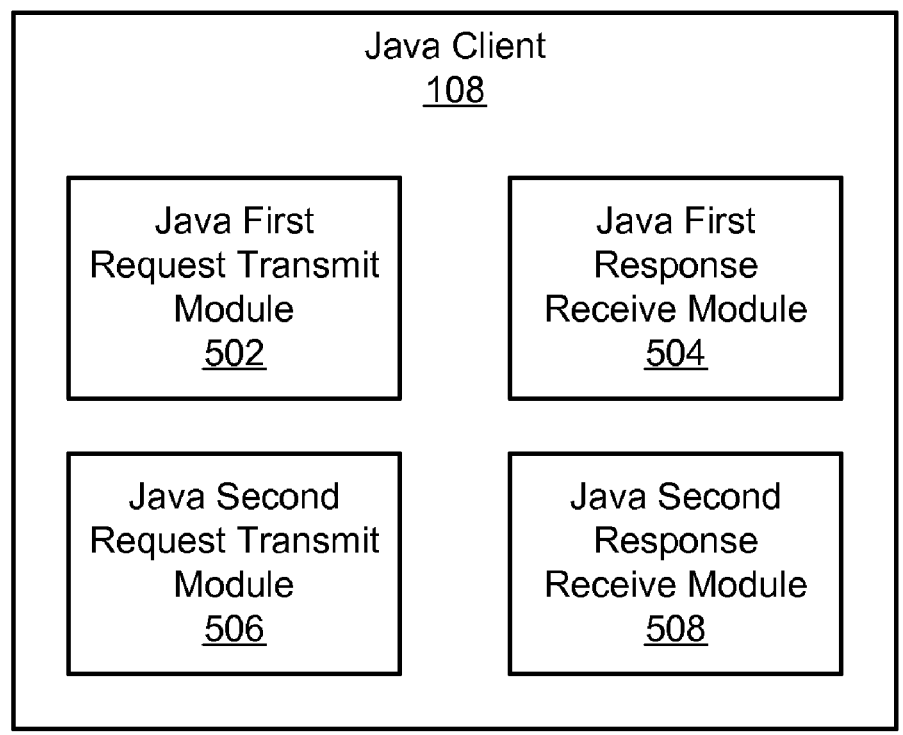
FIG. 5 is a schematic block diagram illustrating an alternate embodiment of an apparatus for enabling conversational transactions in a service oriented environment in accordance with the present invention from the perspective of a Java client.

FIG. 5 is a schematic block diagram illustrating an alternate embodiment of an apparatus 500 for enabling conversational transactions in a service oriented environment in accordance with the present invention from the perspective of a Java client 108. The apparatus 500 includes a Java first request transmit module 502, a Java first response receive module 504, a Java second request transmit module 506, and a Java second response receive module 508, which are described below. The apparatus 500, in one embodiment, is part of the Java client 108. In another embodiment, a portion of the functionality of the apparatus 500 is located in a resource adapter, such as the IC4J 110.

The apparatus 500 includes a Java first request transmit module 502 that transmits a first CT request, that includes a conversation option flag, from the Java client 108 to the first socket 114 of the IMS Connect 102 using TCP/IP. In one embodiment, the Java first request transmit module 502 transmits the first CT request and conversation option flag through a resource adapter. In another embodiment, the Java first request transmit module 502 sends the first CT request to the resource adapter along with an indication that the first CT request is part of a service oriented conversational transaction. The resource adapter then creates a header for the first CT request that includes a conversation option flag that is set and a data structure for a CTID and sends the first CT request with the header to the IMS Connect 102. In one embodiment, the data structure for the CTID is empty when attached to the first CT request. In another embodiment, the Java first request transmit module 502 creates a header for the first CT request that includes a conversation option flag that is set and a data structure for a CTID. One of skill in the art will recognize other ways to transmit a first CT request and a conversation option flag from a Java client 108 to an IMS Connect 102.

The apparatus 500 includes a Java first response receive module 504 that receives a first CT response to the first CT request and a CTID over a TCP/IP connection. The Java first response receive module 504, in one embodiment, stores the CTID and tracks the associated conversational transaction so that the CTID may be attached to subsequent CT requests. The apparatus 500 includes a Java second request transmit module 506 that transmits a second CT request that includes the CTID to a second socket 116 of the IMS Connect 102 using TCP/IP. The Java second request transmit module 506, in one embodiment, sends the second CT response with the header of the first CT response containing the CTID. In another embodiment, the Java second request transmit module 506 sends the second CT request and the CTID and the resource adapter formats a header for the second CT request with the CTID.

The apparatus 500 includes a Java second response receive module 508 that receives a response to the second CT request and the CTID over a TCP/IP connection. The Java second response receive module 508, in one embodiment, stores the CTID for subsequent CT requests. In another embodiment, the Java first response receive module 504 stores the CTID. The modules of the apparatus 500 or other modules may send and receive other CT requests and responses and a conversation end indicator. One of skill in the art will recognize other ways that a Java client 108 and resource adapter, such as the IC4J 110, may send a first CT request with a conversation option flag, receive related CT responses with a CTID, and send a second and subsequent CT requests along with the CTID.

Figure 6:
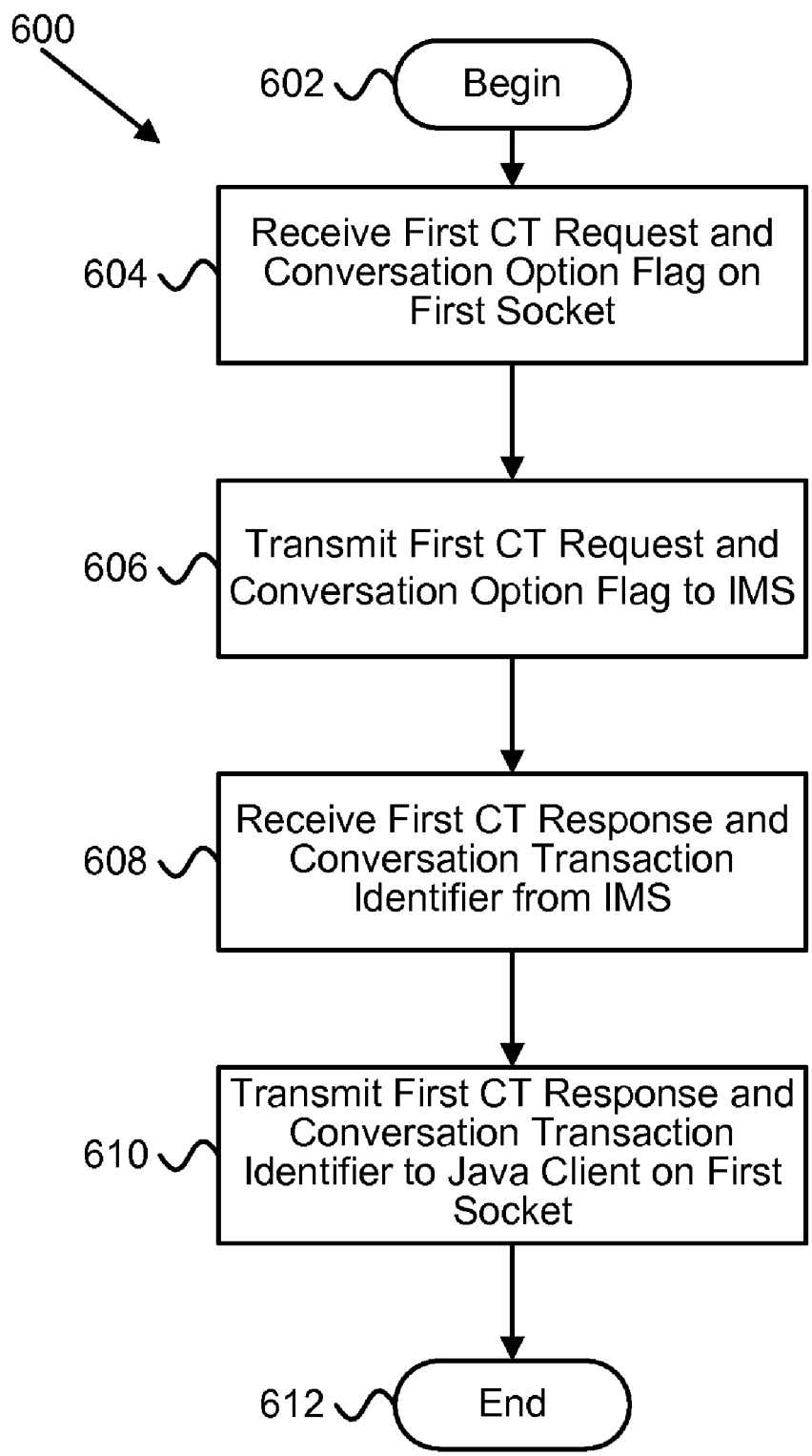
FIG. 6 is a schematic flow chart diagram illustrating one embodiment of a method for enabling conversational transactions in a service oriented environment in accordance with the present invention.

FIG. 6 is a schematic flow chart diagram illustrating one embodiment of a method 600 for enabling conversational transactions in a service oriented environment in accordance with the present invention. The method 600 begins 602 and the first request receive module 202 receives 604 a first CT request and a conversation option flag from a Java client 108. The request is typically received over a TCP/IP connection between the Java client 108 and the IMS Connect 102. The connection may include a resource adapter. In one embodiment, the resource adapter is an IC4J resource adapter 110. The connection may also be through an application server 404. The application server 404, in one embodiment, includes a WAS 112. The conversation option flag may be located in a header of the first CT request and may include a data structure configured to contain a CTID. The first request transmit module 204 transmits 606 the first CT request to the IMS 104. Typically, the first CT request goes through the OTMA 106. In one embodiment, the conversation option flag is transmitted to the IMS 104 in the header of the first CT request.

The first response receive module 206 receives 608 a first response to the first CT request and a CTID from the IMS 104. The CTID may be a TIB token used by the CTID to track the conversational transaction initiated by the first CT response. The first response return module 208 returns 610 the first response and the CTID to the Java client 108 and the method 600 ends 612. In one embodiment, the CTID is located in a header of the first response message. In another embodiment, the first response and CTID are returned via a IC4J 110 associated with the Java client 108. In another embodiment, the IC4J 110 is part of a WAS 112 servicing the Java client 108.

Figure 7:
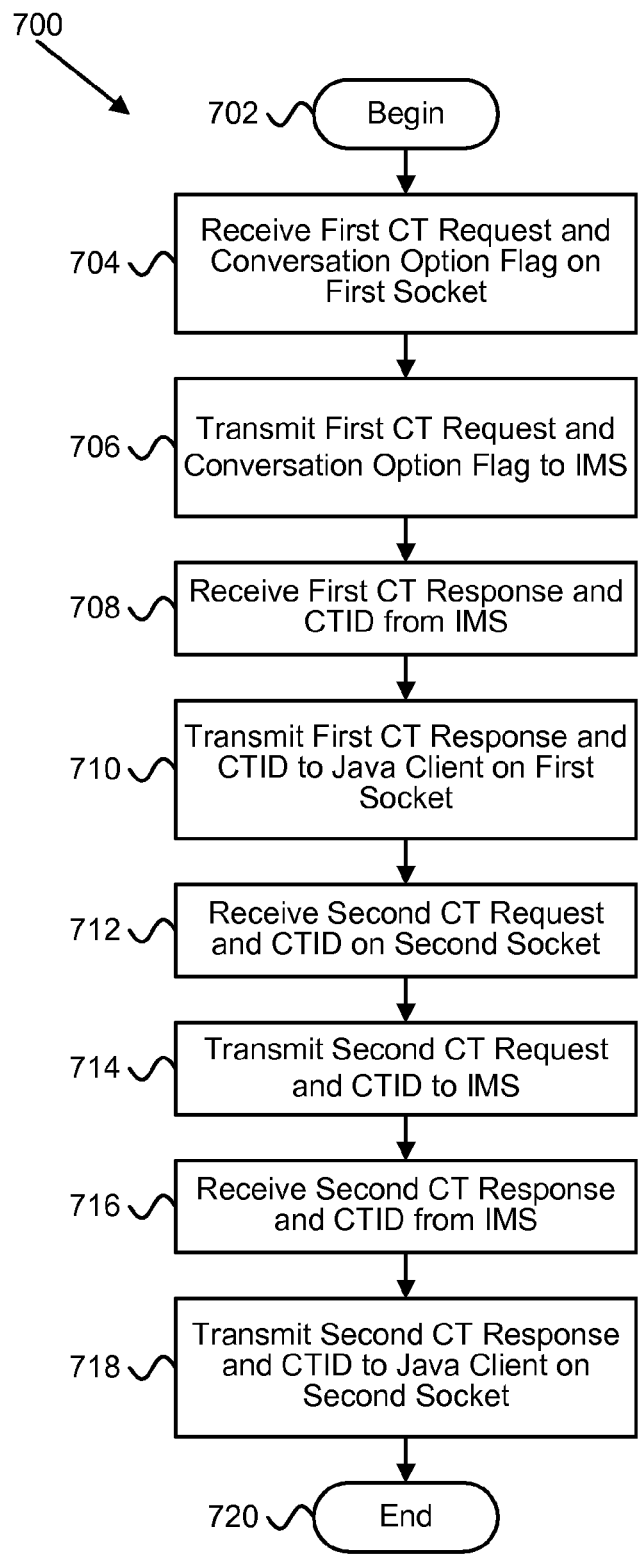
FIG. 7 is a schematic flow chart diagram illustrating a more detailed embodiment of a method for enabling conversational transactions in a service oriented environment in accordance with the present invention.

FIG. 7 is a schematic flow chart diagram illustrating a more detailed embodiment of a method 700 for enabling conversational transactions in a service oriented environment in accordance with the present invention. The method 700 begins 702 and the first request receive module 202 receives 704 a first CT request and a conversation option flag from a Java client 108 through a first socket connection 114 of the IMS Connect 102. The first request transmit module 204 transmits 706 the first CT request to the IMS 104. The first response receive module 206 receives 708 a first response to the first CT request and a CTID from the IMS 104. The first response return module 208 returns 710 the first response and the CTID to the Java client 108.

The second request receive module 302 receives 712 a second CT request and the CTID from the Java client 108 over a second socket connection 116. The second request transmit module 304 transmits 714 the second CT request to the IMS 104. The second response receive module 306 receives 716 a second response to the second CT request and the CTID from the IMS 104. The second response return module 308 returns 718 the second response and the CTID to the Java client 108 over the second socket connection 116 or another connection and the method 700 ends 720.

Figure 8:
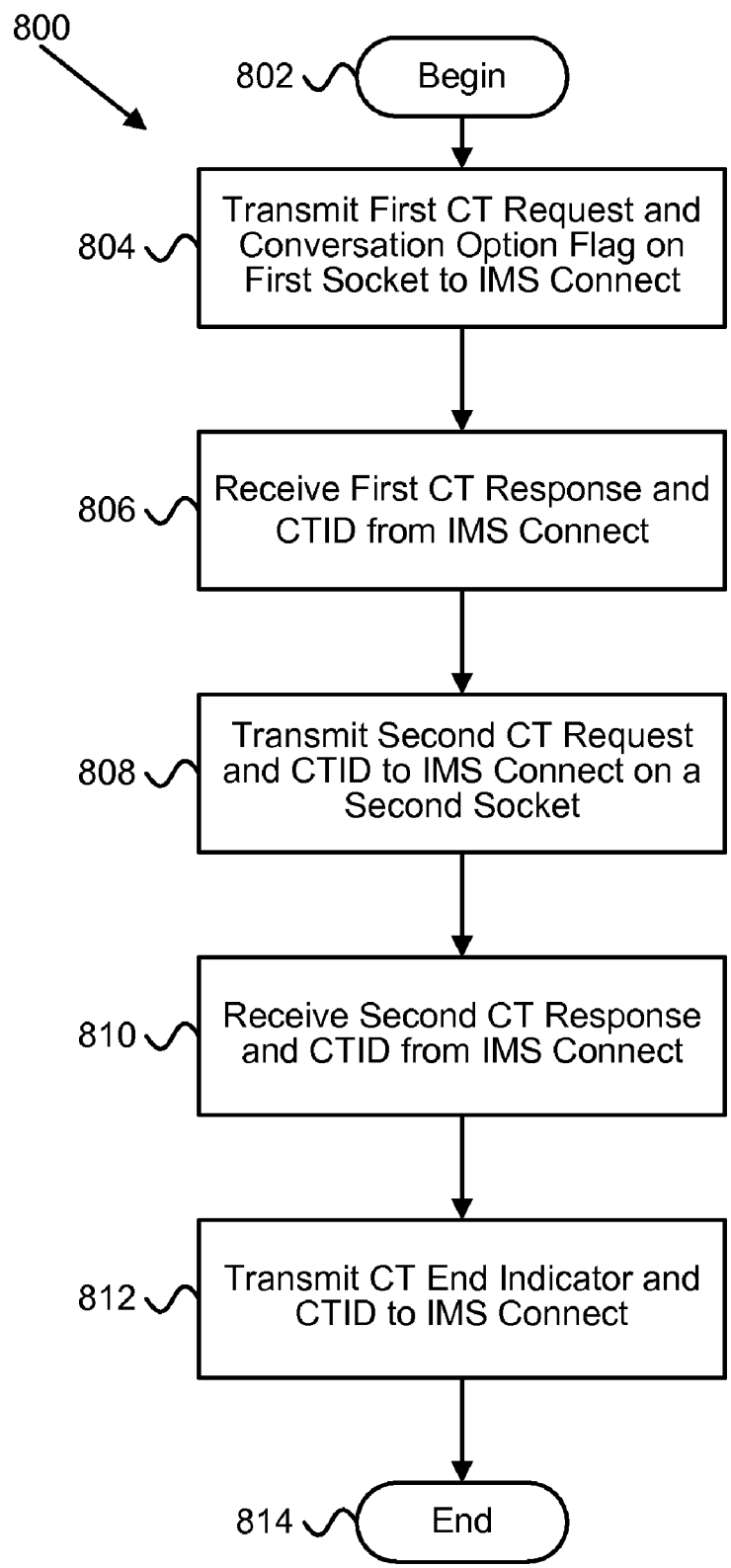
FIG. 8 is a schematic flow chart diagram illustrating an alternate embodiment of a method for enabling conversational transactions in a service oriented environment in accordance with the present invention.

FIG. 8 is a schematic flow chart diagram illustrating an alternate embodiment of a method 800 for enabling conversational transactions in a service oriented environment in accordance with the present invention. The method 800 is from the perspective of the Java client 108, an IC4J 110, or both. The method 800 begins 802 and the Java first request transmit module 502 transmits 804 a first CT request and a conversation option flag to the IMS Connect 102 through a first socket connection 114. The Java first response receive module 504 receives 806 a first CT response and a related CTID from the IMS Connect 102.

The Java second request transmit module 506 transmits 808 a second CT request and the CTID to the IMS Connect 102 over a second socket connection 116. The Java second response receive module 508 receives 810 a second CT response and the CTID from the IMS Connect 102, the Java second request transmit module 506 or similar module transmits 812 a conversational transaction end indicator to the IMS Connect 102, and the method 800 ends 814. One of skill in the art will recognize that the Java second request transmit module 506 and the Java second response receive module 508, or similar modules, may transmit multiple CT requests and receive multiple CT responses as part of a conversational transaction.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a non-transitory computer readable storage medium storing computer usable program code programmed for enabling a conversational transaction in a service oriented architecture, the operations of the computer program product comprising:

receiving at an Information Management System ("IMS") Connect a first conversational transaction ("CT") request comprising a conversation option flag from a Java client over a first Transmission Control Protocol/Internet Protocol ("TCP/IP") socket connection with the IMS Connect, the first CT request comprising a portion of a conversational transaction;

transmitting the first CT request to an IMS;

receiving from the IMS a first response to the first CT request and a conversational transaction identifier ("CTID") associated with the conversational transaction, the first response comprising a portion of the conversational transaction;

returning the first response with the CTID to the Java client in response to the conversation option flag being set, the first response and CTID being transmitted using the first TCP/IP socket connection, the CTID configured to identify to the IMS at least a second CT request from the Java client over a second TCP/IP socket connection with the IMS Connect as part of the same conversational transaction in response to the conversation option flag being set; and returning the first response without the CTID to the Java client, storing the CTID in the IMS Connect, and persisting the first TCP/IP socket connection each in response to the conversation option flag not being set, the first TCP/IP socket connection persisted to receive at least a third CT request from the Java client over the first TCP/IP socket connection as part of the same conversational transaction in response to the conversation option flag not being set.

2. The computer program product of claim 1, further comprising transmitting a conversation end indicator and the CTID to the IMS in response to receiving a conversation end indicator and the CTID from the Java client.

3. The computer program product of claim 1, further comprising, receiving the second CT request and the CTID from the Java client over the second TCP/IP socket connection with the IMS Connect as part of the same conversational transaction;

transmitting the second CT request and the CTID to the IMS;

receiving from the IMS a second response and the CTID, the second response responsive to the second CT request and comprising a portion of the same conversational transaction; and returning the second response and the CTID to the Java client using the second TCP/IP socket connection.

4. The computer program product of claim 1, further comprising:

receiving the third CT request from the Java client over the first TCP/IP socket connection, the third CT request comprising a portion of the same conversational transaction;

transmitting to the IMS the third CT request and the CTID stored by the IMS Connect;

receiving a third CT response to the third CT request and the CTID from the IMS; and returning the third CT response without the CTID to the Java client over the first TCP/IP socket connection.

5. The computer program product of claim 4, further comprising transmitting a conversation end indicator to the IMS and releasing the first TCP/IP socket connection in response to receiving a conversation end indicator from the Java client.

6. The computer program product of claim 1, further comprising receiving a conversation indicator from the IMS along with the first response, the conversation indicator configured to identify the conversational transaction associated with the first CT request and the first response as part of the conversational transaction.

7. The computer program product of claim 6, wherein the IMS Connect stores the CTID in response to the conversation option flag not being set and in response to the conversation indicator.

8. The computer program product of claim 1, wherein receiving the first CT request from the Java client further comprises receiving the first CT request from the Java client through an application server.

9. The computer program product of claim 8, wherein the application server is a Web Sphere Application Server ("WAS").

10. The computer program product of claim 8, wherein the application server further comprises an IMS Connector for Java ("IC4J") resource adapter and receiving the first CT request from the Java client through the application server further comprises receiving the first CT request through the IC4J resource adapter.

11. The computer program product of claim 1, wherein the CTID comprises a Transaction Instance Block ("TIB") token used by the IMS to track the conversational transaction.

12. The computer program product of claim 1, wherein the CTID is transmitted in a header of one of a CT request and a CT response.

13. The computer program product of claim 1, wherein the CTID comprises an eight byte string.

14. The computer program product of claim 1, wherein the conversational transaction is part of a Web Sphere Business Process Choreography transaction.

15. A computer program product comprising a non-transitory computer readable storage medium storing computer usable program code programmed for enabling a conversational transaction in a service oriented architecture, operations of the computer program product comprising:

transmitting a first conversational transaction ("CT") request comprising a conversation option flag from a Java client to an Information Management System ("IMS") Connect using a first Transmission Control Protocol/Internet Protocol ("TCP/IP") socket connection with the IMS Connect, the first CT request comprising a portion of a conversational transaction;

receiving a first CT response to the first CT request over the first TCP/IP socket connection as part of the same conversational transaction, the first CT response comprising a conversational transaction identifier ("CTID") associated with the conversational transaction in response to the conversation option flag being set, the first CT response excluding the CTID in response to the conversation option flag not being set;

transmitting a second CT request to the IMS Connect as part of the same conversational transaction, the second CT request comprising the CTID and transmitted using a second TCP/IP socket connection with the IMS Connect each in response to the conversation option flag being set, the second CT request excluding the CTID and transmitted using the first TCP/IP socket connection each in response to the conversation option flag not being set; and receiving a response to the second CT request, the response to the second CT request comprising the CTID and received over the second TCP/IP socket connection as part of the same conversational transaction each in response to the conversation option flag being set, the response to the second CT request excluding the CTID and received over the first TCP/IP socket connection each in response to the conversation option flag not being set.

16. The computer program product of claim 15, wherein transmitting the first and second CT requests further comprises transmitting the CT requests through an application server.

17. The computer program product of claim 16, wherein the application server further comprises a resource adapter configured to convert service requests in a Service Oriented Architecture ("SOA") from the Java client to TCP/IP service requests for an IMS Connect.

18. The computer program product of claim 17, wherein the resource adapter comprises IMS Connector for Java ("IC4J").

19. The computer program product of claim 15, further comprising creating the first CT request with a header comprising a data structure configured to contain the conversation option flag and the CTID.

20. The computer program product of claim 19, wherein a portion of the data structure in the first CT request configured to contain the CTID is empty.

21. The computer program product of claim 19, wherein a resource adapter creates the header for the first CT request.

22. The computer program product of claim 15, wherein the IMS Connect is configured to transmit the first CT request and the conversation option flag to an IMS in response to receiving the first CT request and the conversation option flag and to transmit the first response and the CTID to the Java client in response to receiving the first CT response and the CTID and the conversation option flag being set.

23. The computer program product of claim 15, further comprising transmitting a conversation transaction end indicator and the CTID to the IMS Connect.

24. An apparatus to enable a conversational transaction in a service oriented architecture, the apparatus comprising:

a first request receive module configured to receive at an Information Management System ("IMS") Connect a first conversational transaction ("CT") request comprising a conversation option flag from a Java client over a first Transmission Control Protocol/Internet Protocol ("TCP/IP") socket connection with the IMS Connect, the first CT request comprising a portion of a conversational transaction;

a first request transmit module configured to transmit the first CT request to an IMS;

a first response receive module configured to receive from the IMS a first response to the first CT request and a conversational transaction identifier ("CTID") associated with the conversational transaction, the first response comprising a portion of the conversational transaction;

a first response return module configured to return the first response along with the CTID to the Java client in response to the conversation option flag being set, the first response and CTID being transmitted using the first TCP/IP socket connection, the CTID configured to identify to the IMS at least a second CT request from the Java client over a second TCP/IP socket connection with the IMS Connect as part of the same conversational transaction in response to the conversation option flag being set;

a persistent socket module configured to return the first response without the CTID to the Java client, store the CTID in the IMS Connect, and persist the first TCP/IP socket connection each in response to the conversation option flag not being set, the persistent socket module persisting the first TCP/IP socket connection to receive at least a third CT request from the Java client over the first TCP/IP socket connection as part of the same conversational transaction in response to the conversation option flag not being set; and wherein the first request receive module, the first request transmit module, the first response receive module, the first response return module, and the persistent socket module comprise one or more of logic hardware and executable code, the executable code stored on a non-transitory computer readable storage medium.

25. The apparatus of claim 24, further comprising, a second request receive module configured to receive the second CT request and the CTID from the Java client over the second TCP/IP socket connection with the IMS Connect as part of the same conversational transaction;

a second request transmit module configured to transmit the second CT request and the CTID to the IMS;

a second response receive module configured to receive from the IMS a second response and at least the CTID, the second response responsive to the second CT request and comprising a portion of the same conversational transaction; and a second response return module configured to return the second response and the CTID to the Java client using the second TCP/IP socket connection.

26. The apparatus of claim 24, wherein the persistent socket module further comprises a persistent second request module configured to:

receive the third CT request from the Java client over the first TCP/IP socket connection, the third CT request comprising a portion of the same conversational transaction;

transmit to the IMS the third CT request and the CTID stored by the IMS Connect;

receive a third response to the third CT request and the CTID from the IMS; and return the third response to the Java client over the persistent first TCP/IP socket connection.

27. A system to enable a conversational transaction in a service oriented architecture, the system comprising:

a Java client;

an Information Management System ("IMS") configured to respond to service requests from the Java client;

an IMS Connect configured to receive service requests from the Java client over a first Transmission Control Protocol/Internet Protocol ("TCP/IP") socket connection with the Java client and a second TCP/IP socket connection with the Java client and to transmit the service requests to the IMS;

one or more logic hardware and a non-transitory computer readable storage medium storing executable code comprising:

a first request receive module configured to receive over the first TCP/IP socket connection at the IMS Connect a first conversational transaction ("CT") request comprising a conversation option flag from the Java client over the first TCP/IP socket connection, the first CT request comprising a portion of a conversational transaction;

a first request transmit module configured to transmit the first CT request to the IMS;

a first response receive module configured to receive from the IMS a first response to the first CT request and a conversational transaction identifier ("CTID") associated with the conversational transaction, the first response comprising a portion of the same conversational transaction;

a first response return module configured to return the first response along with the CTID to the Java client in response to the conversation option flag being set, the first response and CTID being transmitted using the first TCP/IP socket connection, the CTID configured to identify to the IMS at least a second CT request from the Java client over a second TCP/IP socket connection with the IMS Connect as part of the same conversational transaction in response to the conversation option flag being set;

a persistent socket module configured to return the first response without the CTID to the Java client, store the CTID in the IMS Connect, and persist the first TCP/IP socket connection each in response to the conversation option flag not being set, the persistent socket module persisting the first TCP/IP socket connection to receive at least a third CT request from the Java client over the first TCP/IP socket connection as part of the same conversational transaction in response to the conversation option flag not being set.

28. The system of claim 27, further comprising an application server configured to facilitate transmitting the service requests from the Java client and responses to the service requests.

29. The system of claim 28, wherein the application server comprises a Web Sphere Application Server ("WAS").

30. The system of claim 28, wherein the application server further comprises a resource adapter configured to convert service requests in a Service Oriented Architecture ("SOA") from the Java client to TCP/IP service requests for an IMS Connect and to convert responses to the service requests sent from the IMS Connect over a TCP/IP connection to service oriented responses compatible with the SOA.

31. The system of claim 30, wherein the resource adapter comprises an IMS Connector for Java ("IC4J") resource adapter.

32. A method for deploying service oriented computer code to enable a conversational transaction in a service oriented architecture, the method comprising:

determining customer requirements for service oriented requests to an IMS;

integrating service oriented computer code with an IMS Connect interface, the service oriented computer code stored on a non-transitory computer readable storage medium, the service oriented computer code comprising computer code configured to receive, at an Information Management System ("IMS") Connect a first of a server machine, conversational transaction ("CT") request comprising a conversation option flag from a Java client over a first Transmission Control Protocol/Internet Protocol ("TCP/IP") socket connection with the IMS Connect, the first CT request comprising a portion of a conversational transaction;

transmit the first CT request to an IMS;

receive from the IMS a first response to the first CT request and a conversational transaction identifier ("CTID") associated with the conversational transaction, the first response comprising a portion of the conversational transaction;

return the first response along with the CTID to the Java client in response to the conversation option flag being set, the response and CTID being transmitted using the first TCP/IP socket connection, the CTID configured to identify to the IMS at least a second CT request from the Java client over a second TCP/IP socket connection with the IMS Connect as part of the same conversational transaction in response to the conversation option flag being set; and return the first response without the CTID to the Java client, store the CTID in the IMS Connect, and persist the first TCP/IP socket connection each in response to the conversation option flag not being set, the first TCP/IP socket connection persisted to receive at least a third CT request from the Java client over the first TCP/IP socket connection as part of the same conversational transaction in response to the conversation option flag not being set; and verifying proper integration of the service oriented computer code.

33. The method of claim 32, wherein the method comprises providing a Java client conversational transaction template for a service request comprising a data structure in a header of the service request configured to store a conversational transaction identifier ("CTID").

* * * * *